United States Patent
Kahn

(10) Patent No.: US 10,341,498 B2
(45) Date of Patent: Jul. 2, 2019

(54) LATE STAGE CALL SETUP MANAGEMENT IN PREPAID TELEPHONY

(71) Applicant: Ari Kahn, Mount Shasta, CA (US)

(72) Inventor: Ari Kahn, Mount Shasta, CA (US)

( * ) Notice: Subject to any disclaimer, the term of this patent is extended or adjusted under 35 U.S.C. 154(b) by 0 days.

(21) Appl. No.: 14/852,443

(22) Filed: Sep. 11, 2015

(65) Prior Publication Data

US 2017/0078494 A1 Mar. 16, 2017

(51) Int. Cl.
*H04W 4/24* (2018.01)
*H04L 12/46* (2006.01)
*H04M 15/00* (2006.01)
*H04L 12/14* (2006.01)

(52) U.S. Cl.
CPC ........ *H04M 15/80* (2013.01); *H04L 12/1467* (2013.01); *H04M 15/47* (2013.01); *H04M 15/751* (2013.01); *H04W 4/24* (2013.01)

(58) Field of Classification Search
CPC ...... H04M 15/00; H04M 11/00; H04M 17/00; H04M 15/88; G06Q 20/00; G06Q 20/40; H04Q 7/38; H04Q 7/24; H04Q 7/22
USPC ............ 455/405–408, 410–412; 379/114.01, 379/114.15, 114.2
See application file for complete search history.

(56) References Cited

U.S. PATENT DOCUMENTS

| | | | |
|---|---|---|---|
| 6,741,687 B1 * | 5/2004 | Coppage | H04M 15/00 379/114.01 |
| 2008/0102829 A1 * | 5/2008 | Jiang | H04M 15/55 455/433 |
| 2008/0160954 A1 * | 7/2008 | Agarwal | H04L 12/14 455/405 |
| 2009/0061856 A1 * | 3/2009 | Kazmi | H04M 15/00 455/433 |
| 2009/0081988 A1 * | 3/2009 | Kazmi | H04M 15/00 455/406 |
| 2011/0082779 A1 * | 4/2011 | Wong | G06Q 20/28 705/34 |
| 2011/0171931 A1 * | 7/2011 | Kortesniemi | H04L 12/14 455/407 |
| 2011/0235792 A1 * | 9/2011 | Foster | H04M 15/83 379/114.2 |
| 2011/0275346 A1 * | 11/2011 | Fraser | G06Q 30/02 455/408 |
| 2012/0034908 A1 * | 2/2012 | Kahn | H04M 3/42 455/414.1 |
| 2012/0063575 A1 * | 3/2012 | Gallant | H04M 3/42374 379/93.01 |
| 2012/0064859 A1 * | 3/2012 | Jiang | H04L 12/14 455/408 |

(Continued)

*Primary Examiner* — Khawar Iqbal
(74) *Attorney, Agent, or Firm* — Greenberg Traurig, LLP

(57) ABSTRACT

A method for revenue assurance in a telephone network. The method comprises receiving a call request from a first user device on a network to a second user device, where the user device associated with a first user account has an account credit value insufficient to complete the requested call. A call timer duration is set to instantly expire on encountering a chargeable event. The call is continued toward the second user device. Upon encountering a chargeable event, the call is released. The chargeable event may be presenting a Ring Back Tone to the caller and confirming that the second device is ringing. The chargeable event may be detecting when the call has been answered.

7 Claims, 4 Drawing Sheets

Late Versus Early Stage Release on Call Attempt with Insufficient Credit

(56) References Cited

U.S. PATENT DOCUMENTS

2013/0210380 A1* 8/2013 Kahn .................... H04M 15/08
  455/406
2014/0045453 A1* 2/2014 Johnson .......... H04M 1/274566
  455/406
2014/0364094 A1* 12/2014 Blackwell ......... H04M 1/72583
  455/414.1

* cited by examiner

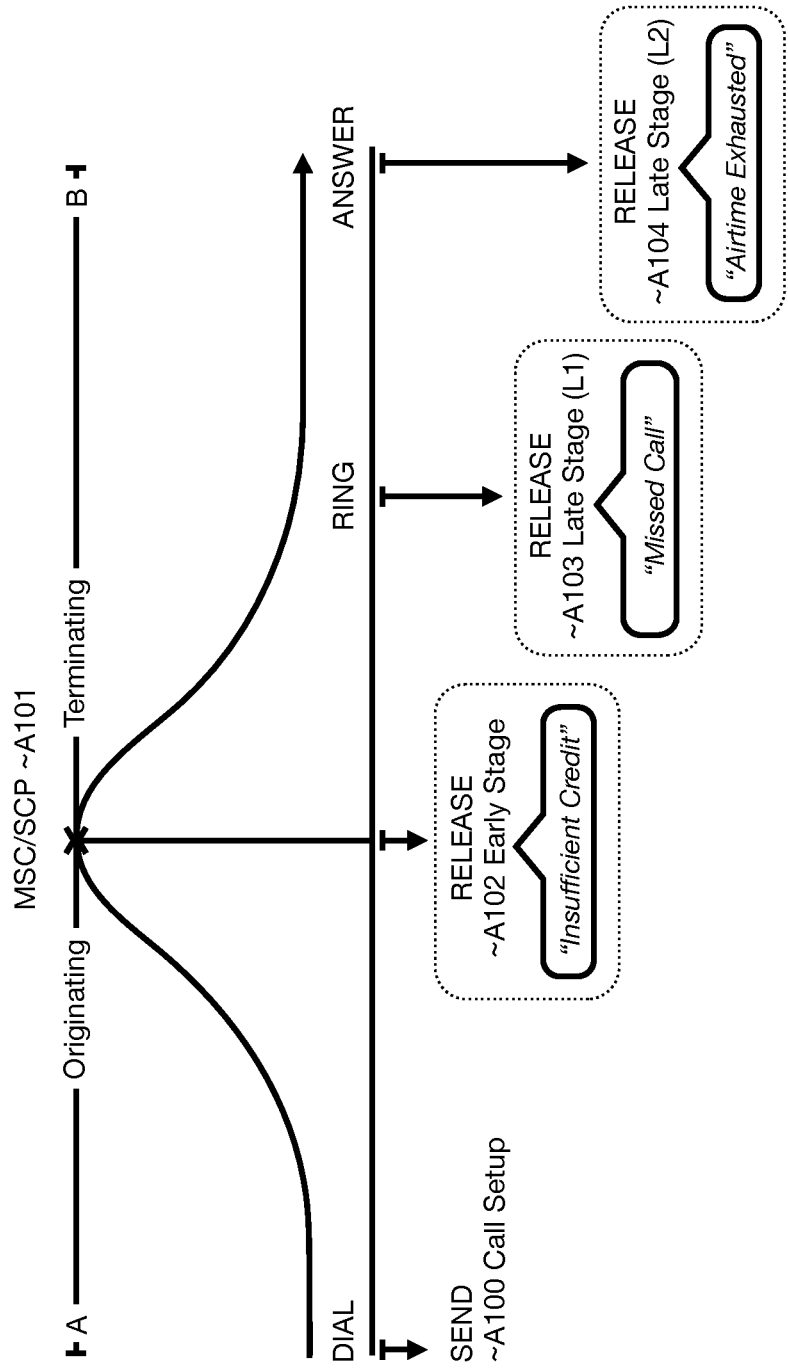
FIG 1A. Late Versus Early Stage Release on Call Attempt with Insufficient Credit

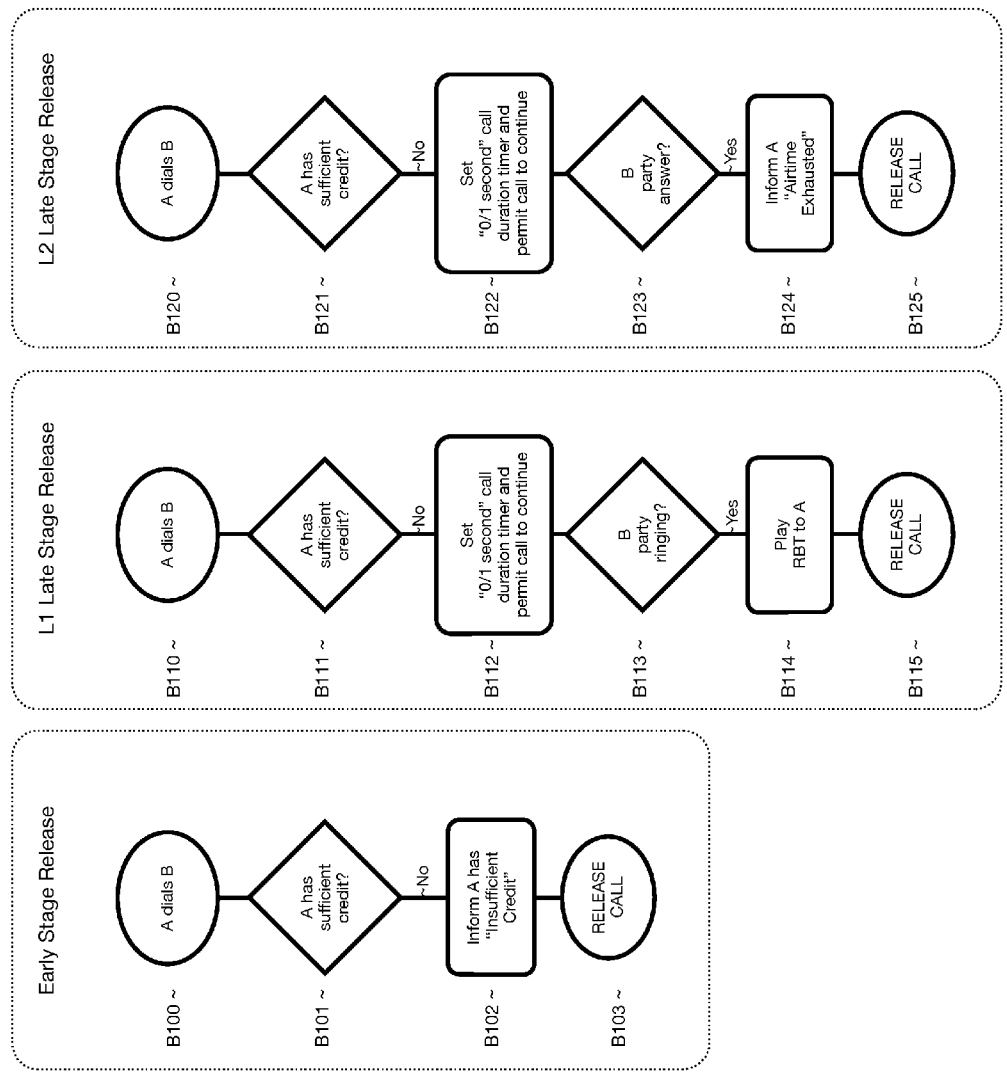
FIG 1B. Early Versus Late Stage Release on Call Attempt with Insufficient Credit

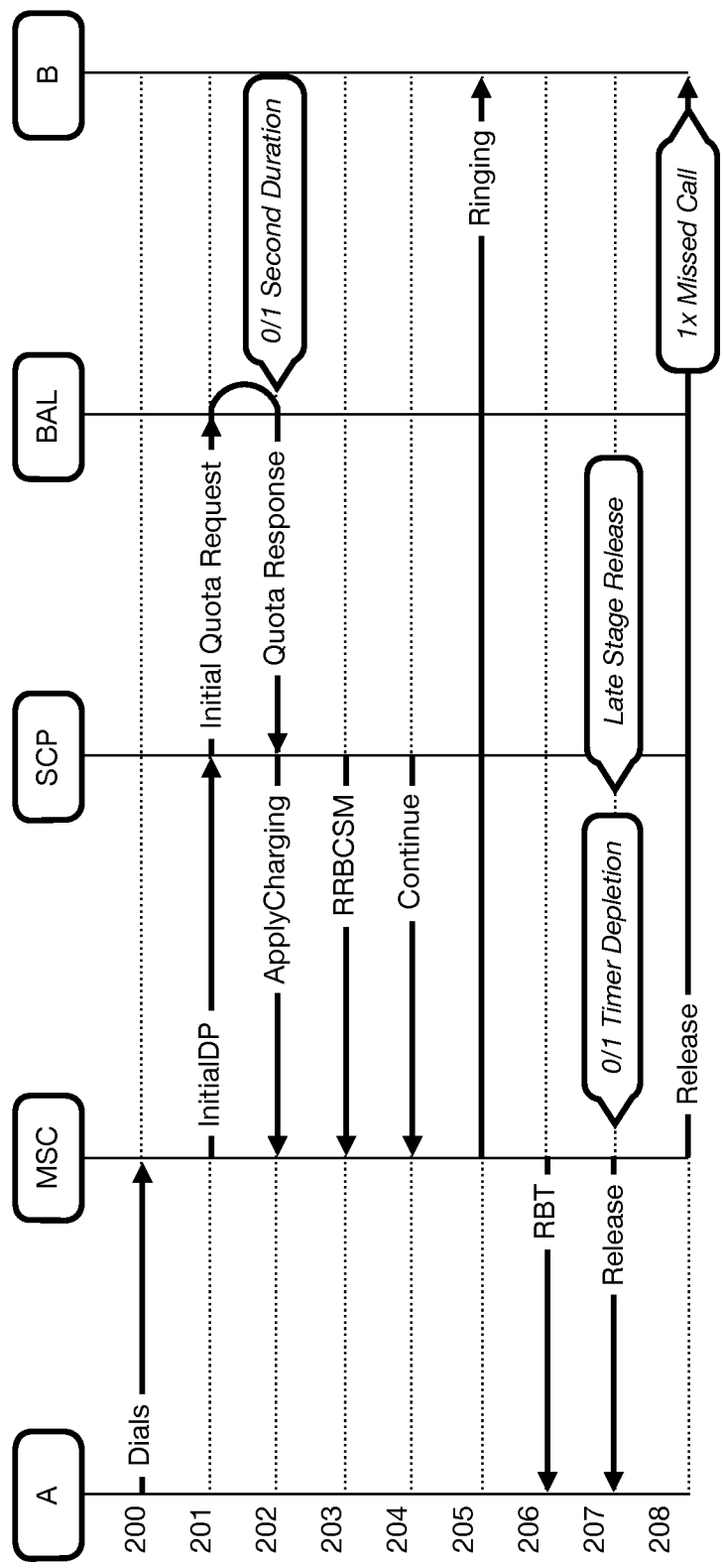
FIG 2. Late Stage Release for Call with Insufficient Credit [INAP Network Release on RBT]

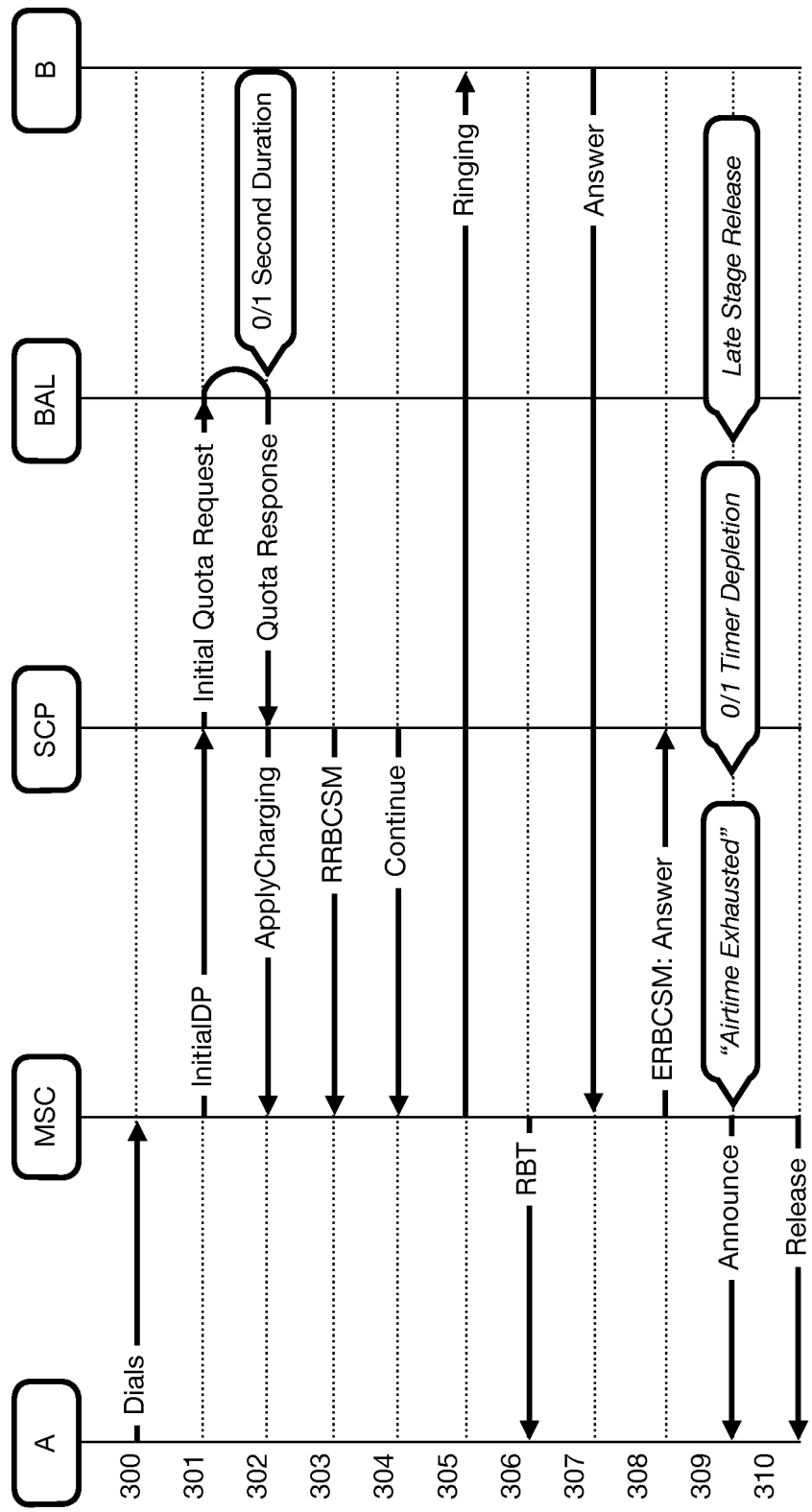
FIG 3. Late Stage Release on Call with Insufficient Credit [INAP Network Release on Answer]

LATE STAGE CALL SETUP MANAGEMENT IN PREPAID TELEPHONY

FIELD OF INVENTION

In the field The subject matter relates to method and systems for late stage telephony revenue assurance and billing verification for callers with insufficient credit.

BACKGROUND

Many users at the mobile prepaid market extremity use prepaid as a "pretext to calling", ringing and hanging up before the called party answers in order to deposit a "missed call" and thereby freely signaling the other party to call back. In a calling party pays world, "miss calling" in the manner and the resultant return, effectively reverses the connection and the billing between the caller (A) and the called party (B) as incoming calls are connected without cost to the recipient.

When a prepaid subscriber requests a call, the servicing operator billing system verifies that the caller has sufficient credit to complete the call before permitting the call to continue and progress beyond setup to the terminating phase (ringing and answering).

This early, originating, call setup stage billing verification ensures that the caller at minimum has sufficient credit to cover the first billing increment if the call is permitted to progress to the dialed destination and the call is answered. It is a revenue assurance policy that only permits calls go to completion if the user has the necessary funds in order to pay for the resultant voice communication.

The quantum of prepaid credit required to progress the call to a terminating phase may be dependent on whether the caller is on a per second or per minute billing protocol. However the credit required typically covers the first minute of use since the terminating carrier often bills the originating carrier on a per minute basis to terminate traffic on its network.

Prepaid telephony is premised on cyclical top up, and the need for airtime replenishment is well known in the art, since a prepaid balance depletes with use over time. Many users however regularly find themselves without sufficient prepaid credit remaining in their account to raise a call. These users become dormant as they can no longer access the network and engage the ring to drive their own inbound connections using the "miss calling protocol".

There is thus a need to continue servicing these users without credit, along the established call path, in a signaling context, permitting them to continue "miss calling", without disrupting the core prepaid premise governing telephony, which is "users are required to have sufficient prepaid credit (airtime) in order to engage in a voice conversation".

BRIEF SUMMARY OF EMBODIMENTS OF THE INVENTION

A method for revenue assurance in a telephone network comprises receiving a call request from a first user device on a network to a second user device. The user device associated with a first user account has an account credit value insufficient to complete the requested call. A call timer duration is set to instantly expire on encountering a chargeable event. The call is progressed toward the second user device. A chargeable event is encountered and then the call is released.

In a variant of the method for revenue assurance in a telephone network, the chargeable event is selected from the group comprising a) presenting a Ring Back Tone to the caller and confirming that the second device is ringing; and b) detecting when the call has been answered.

In another variant of the method for revenue assurance in a telephone network, the method comprises playing the Ring Back Tone to the first user prior to releasing the call.

In a further variant of the method for revenue assurance in a telephone network, the method comprises playing the Ring Back Tone to the first user prior to activation and expiration of the call duration timer.

In still another variant of the method for revenue assurance in a telephone network, receiving a call request from a first user device on a network comprises receiving a call request at a mobile switching center (MSC). The method further comprises initiating a network dialog between the MSC and a service control point (SCP) whereby the SCP instructs the MSC to set a call duration timer to instantly expire upon encountering a chargeable event and instructs the MSC to continue progressing the call toward the second device. On the MSC receiving confirmation that the second device is ringing, the MSC notifies the SCP that the second device is ringing. Responsive to being notified that the destination is ringing, the SCP releases the call.

In another variant of the method for revenue assurance in a telephone network, the call timer duration is set to one or zero seconds.

In a further variant, a telephone network comprises: a first user device configured to request a call; a mobile switching center (MSC); a service control point (SCP); a prepaid billing manager; and a second user device configured to receive a call from the first user device. The telephone network is configured to receive a call request from the first user device to the second user device, wherein the first user device is associated with a first user account that has an account credit value insufficient to complete the requested call. The prepaid service control point is configured to check the account value of the first user account and verify the account value is insufficient to place a call. The SCP is configured to instruct the MSC to set a call duration timer to instantly expire upon the MSC encountering a chargeable event. The MSC is configured to notify the SCP that the chargeable event was encountered. The MSC is configured to release the call upon encountering the chargeable event.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF DRAWINGS

FIG. 1A. is a conceptual timeline depicting key events in a telephony call and highlighting early versus late stage call release on insufficient credit.

FIG. 1B. is a series of call flow charts that similarly depict the distinction between early versus late stage call release on insufficient credit.

FIG. 2. is a call process step ladder illustrating late stage billing assurance and verification in a preferred INAP embodiment.

FIG. 3. is a call process step ladder illustrating late stage billing assurance and verification in an alternate INAP embodiment.

Skilled artisans will appreciate that elements in the drawings are illustrated for simplicity and clarity and have not necessarily been drawn to scale. For example, the dimensions of some of the elements in the figures may be exaggerated, relative to other elements, and some steps condensed and others omitted to improve understanding of the embodiments of the present invention.

Further it will be appreciated that elements presented as "italicized tags" are simply commentary highlighting key events. While these tags are placed within the step ladder sequence, between lines connecting network node elements (A MSC SCP BAL B), they are not intended to logically connect these network nodes nor are they originating from the said nodes. Tags include: announcements (such as "Insufficient Airtime" and "1× missed call") and logic (such as setting "0/1 Second Duration Timer" and expiring the same).

Glossary of Terms

CAMEL: Customized Application for Mobile network Enhanced Logic
    INAP: Intelligent Network Application Protocol
    ISUP: ISDN User Part
    ISUP ACM: Address Complete Message
    ISUP ANS: Answer
    ISUP IAM: Initial Address Message
    ISUP REL: Release
    IVR: Interactive Voice Response
    MAP: Mobile Application Part
    MSC: Mobile Switching Center
    RBT: Ring Back Tone
    SCP: Service Control Point
    SIP: Session Initiation Protocol
    SMS: Short Message Service
    SS7: Signaling System Seven
    USSD: Unstructured Supplementary Services Data
    VOIP: Voice over Internet Protocol
    3GPP: Third Generation Partnership Program

DETAILED DESCRIPTION

Telephony calls are logically and physically completed in two phases:

1. An Originating Phase which describes the connection between the caller and the servicing Switch.
2. A Terminating Phase which describes the connection between the servicing Switch and the called party.

These two distinct phases permit intelligent call handling and control logic to execute between the originating and the terminating processes. Thus a call between "A and B" actually consists of two independent call paths ("legs") bridged together. As such, a servicing switch can conduct dialogs and call control with the caller and the called party, separately and independently.

The embodiments describe advanced billing procedures for telephony calls and by illustration, references call flows in Mobile Telephony Networks utilizing ISUP/SS7 and INAP circuit switching. However, suitably skilled network switching and billing artisans will appreciate the principles taught herein are readily applied to different network architectures and signaling protocols.

These include different network switching and signaling topologies and protocols, different billing control and sequencing, including without limitation, networks that utilize CAMEL, and networks that employ VOIP Packet Switching and Signaling protocols such as SIP. Further, network real time billing systems, may utilize "recurring quota allocations" in their revenue assurance process, which in particular may include billing transactions between network nodes that follow call release, and which are therefore not relevant to this disclosure.

This present invention and the methods disclosed herein, shifts the billing verification governing operator revenue assurance from the early "Originating" call setup phase, to the late "Terminating" phase which includes ringing, ringback and answering events, thereby permitting access to the ring for users who have depleted their prepaid credit or who have no credit.

Describing this "early versus" stage billing assurance and verification for users with insufficient credit, with reference to FIG. 1A:

A100: User A dials telephone number of user B.

A101: The call setup request is received by the servicing (originating) MSC. The MSC establishes a MAP dialog (not shown) with the Prepaid SCP which verifies the credit sufficiency of caller A to complete the requested call to B.

The SCP on determining that caller A has insufficient credit to complete the call, instructs the MSC to announce to the caller that they have insufficient credit and to releases the call.

A102: The user is disconnected.

At this point the call has thus been released at the early, originating setup phase. This sequence describes the current state of the prepaid billing art for callers with insufficient credit.

Describing now the presently disclosed advance to the prepaid art where the call is permitted to progress beyond the early originating call setup phase and again with reference to FIG. 1:

A101: On determining the user has insufficient credit to complete the call, the SCP, instead of instructing the MSC to announce the to the caller they have insufficient credit and then releasing (disconnecting) the call, the SCP now instructs the MSC to continue processing the call and to set the call timer duration (the initial quota duration) to instantly expire on encountering a chargeable event.

The MSC progresses the call toward the dialed destination, for example by transmitting an ISUP IAM (Initial Address Message).

A103: The MSC on receiving confirmation that the destination is ringing, for example by receiving an ISUP ACM, the network plays a RBT (Ring Back Tone) to caller A. RBT presentation precipitates a chargeable event which in turn activates the call duration timer which governs the maximum allowable time for a call on encountering a chargeable event. The call duration timer is set to expire instantly on activation which results in the MSC releasing the call. Releasing the call after RBT presentation results in a "missed call" displayed on the B party device. This sequence discloses Late Stage One (L1) revenue assurance.

A104: In an alternate embodiment where RBT is not defined as a chargeable event and in cases where calls are immediately answered, the MSC permits the destination to continue ringing until the call is either answered (ISUP ANS) or until a maximum ring timer expires. On detecting that the B party has answered the call, the initial call duration quota and the timer that monitors the call duration instantly "fires and expires".

That is, once the MSC encounters the "answer" chargeable event, the call duration timer "fires" (begins count down). And since the call duration timer for a caller with insufficient credit is set to a maximum of just one second, as detailed below, it immediately "expires" (reaches zero). On call duration expiry the network announces to caller A that their "Airtime is exhausted" and releases the call. This call sequence discloses Late Stage Two (L2) revenue assurance.

It will be appreciated that the "Airtime exhausted" notification to caller A, in the exemplary embodiment, is a voice announcement on the existing call. However alternate notifications, for example playing specific tones to caller A, or sending the caller a network generated message after releasing the call, may achieve the same result. Similarly call event counters may "count up" to a maximum allowable time rather than "count down" to zero.

Furthermore in addition to the announcement, or in place of the announcement, network service options may be presented to caller A on the existing call setup utilizing IVR (interactive voice response) menus or via alternate bearers and protocols including without limitation, via SMS message, via USSD messaging or via Internet Protocol data messaging or "in app" (in application) notifications and options, permitting the user to replenish credit or to select alternate options to notify the called party. Notwithstanding the announcement and options presented to A, the call leg to B is released.

Prepaid Billing methods are well understood. In particular prepaid credit verification during the Originating BCSM (Basic Call State Model). BCSM is a fundamental concept for intelligent networking control where the call goes through a number of predefined states. These states of the call are described in the BCSM and generally follow the ISUP signaling path.

Billing standards published by 3GPP (Third Generation Partnership Program) and INAP (Intelligent Network Application Protocol) identify several distinct chargeable events in an originating voice call. These chargeable events include:

1. Call Setup Voice channel seizure
2. Caller Ring Back Tone presentation
3. Called party answers These events correspond to well known PICS (points in call) that describe the originating BCSM and the intelligent network triggers and event detection points that may be armed to notify a SCP (Service Control Point). These events may also be programmatically subscribed to, by an SCP during a call setup dialog with the MSC, utilizing the well understood RRBSCM (Request Report BCSM) and similar Intelligent Networking protocols.

Periodic billing verification during a call connected phase is also well understood. Intelligent Networks support an internal network dialog between the originating MSC and the Prepaid SCP and Billing System that permits the billing system to audit and control call progression and duration, which is dependent on the amount of credit remaining in the callers account. The prior art MSC/SCP dialog that governs realtime or substantially realtime billing is well known.

In a preferred embodiment the SCP selectively requests the MSC to enable RBT presentation as a "chargeable event", only for callers with insufficient credit. The desired effect of selectively enabling this chargeable event in this manner, is that callers who have sufficient credit are not charged for RBT while calls from users with insufficient credit trigger the "zero or one second" initial quota call duration timer method as described, on RBT presentation. On encountering the RBT event the MSC timer "fires and expires" substantially simultaneously without actually charging the caller since the call is instantly released. On this call duration timer expiration, the network announces to caller A that their "Airtime is exhausted" and releases the call. This call sequence discloses Late Stage One (L1) revenue assurance.

In an alternate embodiment, the network uniformly enables RBT presentation as a "chargeable event" for all callers, while still permitting calls from users with insufficient credit to engage the ring without payment, since these callers without credit would then trigger the "zero or one second" initial quota call duration timer method, as described above, on RBT presentation.

Since "miss calling" is predicated on the caller hearing the RBT and disconnecting the call before it is answered, it consumes valuable network resources without generating revenue. Many networks experience high volumes of intentional "miss calling" (typically 20% of all calls are missed calls, where the caller disconnects before answer, and in some emerging market regions miss calling is an astronomical 70%). Enabling RBT as a chargeable event recovers network costs and attenuates use and abuse.

Since many subscribers are billed on a "per second basis", legitimate callers who are intent on actually completing the connection and conducting a voice conversation would, on RBT being a chargeable event, only incur a marginal increase in communication cost, in setting up the call and "ringing the destination", compared to the actual cost of the connected and completed conversation which is typically of longer duration than ringing.

The net and desired result, is these "less cost sensitive and more economically empowered users" then subsidize "the penny conscious poor" who cannot afford to pay for a call, as well subsidizing those who have exhausted their airtime and can no longer ring to signal and request call back in the state of the prior call completion art. Since the B party is already paying to connect the A party by calling them back on receiving a "missed call", paying a little extra to subsidize and enable "miss calling" as disclosed in this present invention, is socially acceptable.

An additional positive effect enabling RBT as a chargeable event, is that callers will only ring for long duration when they urgently need to talk. Since many users today have their phone in close proximity, and almost all users "screen calls on caller identity", they are instantly alerted by the ring and acutely aware of an incoming call. If they choose not to answer the call within the first few moments of ringing, they are "subtly and silently" signaling to the caller that they are not available to speak or do not wish to speak at this time.

Since with RBT as a chargeable event the caller is now incurring cost to ring, they are enticed to disconnect sooner if their calls continue to ring without being answered early on. This reinforces a social protocol that the more important the call, the longer the caller will ring. However it now does so at some cost to the caller. The result, in the main, is shorter duration ringing which in itself delivers a valuable lifestyle enhancing benefit in that it does not disturb the called party as much as incessant longer ringing currently does. While rings lack context, ring frequency and duration transmits intent.

In yet a further embodiment L1 Late Stage Revenue Assurance operates by the SCP requesting the "Alerting" event notification in order to instruct the MSC to release the call on RBT presentation to caller A, before the call is answered by the called party B. In related embodiment, absent the ability of the SCP to selectively enable RBT as a chargeable event, the SCP requests notification from the MSC on B party "Alerting" (ringing). On receiving notification that the B party is ringing, the SCP momentarily delays instructing the MSC to release the call in order to permit time for the RBT to present to caller A. Such an intentional delay on instructing would amount to one or two seconds, sufficient to provide adequate time for RBT presentation to the caller.

Describing Early Stage Release (Prior Art) with reference to FIG. 1B:

B100: User A dials user B requesting a telephony call.

B101: The network performs a credit verification to determine whether the caller has sufficient credit to complete the call.

B102: If caller does not have sufficient credit, the network informs caller that there is "insufficient credit to complete the call".

B103: The network releases the call and terminates the request.

Describing Late Stage Release (L1 Newly Disclosed) with reference to FIG. 1B:

B110: User A dials user B requesting a telephony call.

B111: The network performs a credit verification to determine whether the caller has sufficient credit to complete the call.

B112: If caller A does not have sufficient credit, the network sets an initial call duration timer equal to "zero or one" seconds and permits the call to continue.

B113: The network progresses the call towards the B party and monitors amongst other conditions, for "ringing" and "answered" events.

B114: If the B party rings, the network presents a Ring Back Tone (RBT) to caller A.

B115: After presenting RBT the network releases the call and terminates the request.

Describing Late Stage Release (L2 Newly Disclosed) with reference to FIG. 1B:

B120: User A dials user B requesting a telephony call.

B121: The network performs a credit verification to determine whether the caller has sufficient credit to complete the call.

B122: If caller A does not have sufficient credit, the network sets an initial call duration timer equal to "zero or one" seconds and permits the call to continue.

B123: The network progresses the call towards the B party and monitors amongst other conditions, for "ringing" and "answered" events. If the B party rings, the network presents a Ring Back Tone (RBT) to caller A (not shown). On hearing RBT the caller may choose to disconnect the call.

B124: If the B party answers, or the call is diverted, for example to a voicemail service which in turn answers the call, the initial call duration timer activates and instantly expires. The network informs caller A that their "airtime is exhausted".

B125: The network releases the call and terminates the request.

Describing the preferred L1 Late Stage Revenue Assurance embodiment in greater detail with reference to FIG. 2:

200: User A requests a new call by dialing telephone number of user B.

201: The MSC sends an InitialDP (Initial Detection Point) event notifying the Intelligent Network SCP of the new call.

The SCP in turn processes the InitialDP request and sends an "initial quota request" to the Prepaid Balance Manager (BAL). After authorizing the user, BAL grants the available maximum duration quota for the call to the SCP. The duration quota describes the maximum initial call duration that the MSC then administers using well known call control timers.

In the preferred embodiment BAL calculates the duration Quota (Q) by dividing the available prepaid Credit (C) by the applicable call Tariff (T):

$$Q=C/T$$

Since the subject matter of this present disclosure is related to callers who have insufficient credit to complete the call, C is necessarily less than T. For illustrative purposes assuming:

T="2 cents per second" and
C="1 cent" then
Q="½ (one half) seconds"

Since calls are typically monitored and clocked in one second increments, duration Q may be rounded up or down to the nearest second. In the case of insufficient credit balance, as illustrated above, duration Q thus computes to either "zero" or "one" second in the exemplary embodiment. If a prepaid balance is negative, Q may be reset to "zero" or "one".

The intended consequence in permitting the call to progress beyond the early originating phase on insufficient credit, together with an initial duration quota of just "one or zero seconds", is to instantly force call release the moment a chargeable event is encountered, thereby permitting the caller to "signal" B, to ring the called party, without permitting the call to fully progress to "conversation" (speech) since the maximum allowable connected call duration is exhausted on encountering a chargeable event (for example on RBT or answering).

202: ApplyCharging

The SCP sends "ApplyCharging" to the MSC. This sets up the maximum call duration timer (quota) as described above, which is then managed by the MSC.

203: RRBCSM

The SCP sends "Request Report BSCM" to the MSC. This requests the MSC to notify the SCP on events, including without limitation, RINGING, ANSWER and DISCONNECT so the SCP may take any appropriate action.

204: CONTINUE

The SCP sends "Continue" to the MSC. This directs the MSC to continue call processing into the terminating phase, towards the B party.

205: A is logically connected to B.

206: On receiving confirmation that the B party is "ringing" the MSC substantially simultaneously presents RBT (Ring Back Tone) to caller A, and optionally sends an event report (ER BCSM not shown) notifying the SCP.

207. On presenting RBT to the caller, this chargeable event activates the initial call quota duration timer set in the MSC, which instantly "fires and expires". The MSC releases the call to complete L1 Late Stage Revenue Assurance by not permitting the call to progress beyond the ringing and RBT state. The MSC may optionally announce to the caller, that their "Airtime has been exhausted" before releasing the call, to encourage users to replenish their credit (not shown).

In L2 Late Stage Revenue Assurance described following, the MSC instantly releases the call on "Answer" since the initial duration quota, which is set to "0 or 1 second" by the Prepaid Balance Manager as described above, expires immediately once the call is answered. In L1 the SCP typically also requests reporting on the "Answer" event in order to safeguard against inadvertent billing leakage, by explicitly releasing the call in the event that the MSC fails to expire the timer and release the call.

Describing the L2 Late Stage Revenue Assurance model in greater detail with reference now to FIG. 3:

300: User A requests a new call by dialing telephone number of user B.

301: The MSC sends an InitialDP (Initial Detection Point) event notifying the Intelligent Network SCP of the new call.

The SCP in turn processes the InitialDP request and sends an "initial quota request" to the Prepaid Balance Manager (BAL). After verifying the credit balance available to the user, BAL grants the available duration quota for the call to the SCP. The duration quota describes the maximum initial call duration that the MSC then administers using well known call timers.

The Initial Quota Duration is computed as described above.

Again the intended consequence in permitting a call with insufficient credit to progress beyond early stage setup, together with an initial duration quota of just "one or zero seconds", is to instantly force call release the moment the chargeable event is encountered, thus permitting the caller to "signal", to ring the called party, without permitting the call to fully progress to "conversation" (speech).

302: ApplyCharging

The SCP sends "ApplyCharging" to the MSC. This sets up the initial quota call duration timer managed by the MSC.

303: RRBCSM

The SCP sends "Request Report BSCM" to the MSC. This requests the MSC, for example, to inform the SCP on, amongst other events, RINGING, ANSWER and DISCONNECT.

304: CONTINUE

The SCP sends "Continue" to the MSC. This directs the MSC to continue processing and progressing the call towards B.

305: A is logically connected to B.

On receiving confirmation that the B party is "ringing" the MSC substantially simultaneously presents RBT (Ring Back Tone) to caller A.

306: On receiving RBT, caller A may choose to end the call since they have successfully signaled the B party.

307: The B party answers the call.

308: The MSC sends an event report (ER BCSM ANSWER) to the SCP.

309: The MSC initial call duration timer activates on encountering the answer chargeable event and instantly expires.

In one embodiment utilizing a single quota system the MSC announces "Airtime Exhausted" to caller A and releases the call.

In an alternate embodiment utilizing a "recurring quota" system, when an initial quota timer is about to deplete, the MSC would send an event report to the SCP requesting a further interim quota. Since the subject matter of the present invention relates to callers who have insufficient credit, the SCP would in this instance not send additional ApplyCharging requests to the MSC since the user has exhausted their airtime quote. The SCP would therefore simply instruct the MSC to release the call.

Notwithstanding such a "recurring quota system", this present invention sets the initial quota timer to an absolute minimum for callers with insufficient credit, to ensure the call duration limit is reached the moment a chargeable event is encountered. Since the timer essentially expires immediately on activation, there is practically no opportunity for the MSC to request a further interim quota and consequently the call is released, typically after announcing that airtime credit has been exhausted.

310: The MSC instantly releases the call to complete L2 Late Stage Revenue Assurance by not permitting the call to continue with speech.

In a further embodiment Late Stage Billing Assurance and credit verification may selectively be applied, dependent on the called party destination. For example, the SCP and BAL nodes may only continue calls beyond early stage with an instantly expiring duration timer, if the call is set to terminate on the home network or if the call is a domestic rather than an international call.

The ability to selectively apply the Late Stage Release methods disclosed, may limit any carrier exposure, since "off net" calls that are permitted to progress beyond call setup may incur signaling and or terminating fees, particularly if the call is answered on a foreign network.

The above methods disclosed permit prepaid users with insufficient credit to complete a call request, and users with zero prepaid credit, to engage the ring and signal the dialed party using the well known "missed calling" protocol while simultaneously adhering to revenue assurance practices that prevent such users from fully progressing the call request to speech without paying.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method, comprising:
   receiving, by a mobile switching center (MSC) of a telephone network, during an originating call setup phase of a call, a telephony call setup request from a first user device;
   wherein the telephony call setup request identifies a telephone number associated with a second user device;
   wherein the first user device is associated with a user account having an insufficient account credit value that is insufficient to complete a terminating call setup phase of the call;
   initiating, by the MSC of the telephone network, a network dialog with a service control point (SCP) whereby, based on the insufficient account credit value, the SCP instructs the MSC to set a maximum call duration timer to a value that is less than or equal to 1 second;
   setting, by the MSC of the telephone network, the maximum call duration timer to the value that is less than or equal to 1 second;
   continuing, by the MSC of the telephone network, after the setting of the maximum call duration timer, to progress the call through the terminating call setup phase toward the second user device;
   activating, by the MSC of the telephone network, the maximum call duration timer upon encountering a chargeable event during the terminating call setup phase of the call;
   presenting, by the MSC of the telephone network, a Ring Back Tone to the first user device;
   wherein the Ring Back Tone is presented to the first user device before the maximum call duration timer expires;
   receiving, by the MSC of the telephone network, a confirmation that the second user device is ringing;
   notifying, by the MSC of the telephone network, the SCP that the second user device is ringing; and
   releasing, by the SCP, the call in response to being notified that the second user device is ringing and after the maximum call duration timer expires.

2. The method of claim 1, wherein the call duration timer is set to zero.

3. A telephone network system, comprising:
   a first user device configured to request a call;
   a mobile switching center (MSC);
   a service control point (SCP);
   a prepaid billing manager;
   a second user device configured to receive the call from the first user device;
   wherein:
      the telephone network is configured to receive, at the mobile switching center (MSC), a telephony call setup request from the first user device during an originating call setup phase of the call;
      the first user device is associated with a user account having an insufficient account credit value that is insufficient to complete a terminating call setup phase of the call;
      the SCP is configured to determine that the user account has the insufficient account credit value to complete the terminating call setup phase of the call;
      the SCP is configured to instruct the MSC to set a maximum call duration timer to a value that is less than or equal to 1 second;
      the MSC is configured to continue, after the setting of the maximum call duration timer, to progress the call through the terminating call setup phase toward the second user device;
      the MSC is configured to activate the maximum call duration timer upon encountering a chargeable event during the terminating call setup phase of the call;
      the MSC is configured to present a Ring Back Tone to the first user device;
      wherein the Ring Back Tone is presented to the first user device before the maximum call duration timer expires;
      the MSC is configured to receive a confirmation that the second user device is ringing;

the MSC is configured to notify the SCP that the second user device is ringing and that the maximum call duration timer has expired; and the MSC is configured to release the call upon being notified that the maximum call duration timer has expired.

4. The telephone network system of claim 3, wherein the call duration timer is set to zero.

5. A method, comprising:

receiving, by a network switching center of a telephone network, during an originating call setup phase of a call, a telephony call setup request from a first user device;

wherein the telephony call setup request identifies a telephone number associated with a second user device;

initiating, by the network switching center, a network dialog with a service control point (SCP) to request a call processing instruction from a service control point for a terminating call setup phase of the call;

wherein, when an account associated with the first user device has an insufficient credit value to complete a terminating call setup phase of the call, the call processing instruction is configured to:

i) instruct the network switching center to continue to progress the call through the terminating call setup phase, and ii) identify a call duration quota to be a value that is less than or equal to 1 second;

wherein a call duration quota is from a billing system;

setting, upon the receipt of the call processing instruction, by the network switching center, a maximum call duration timer to the value that is less than or equal to 1 second;

continuing, after the setting of the maximum call duration timer, by the network switching center, to progress the call through the terminating call setup phase toward the second user device;

activating, by the network switching center of the telephone network, the maximum call duration timer upon encountering a network event during the terminating call setup phase of the call;

presenting, by the network switching center of the telephone network, a Ring Back Tone to the first user device;

wherein the Ring Back Tone is presented to the first user device before the maximum call duration timer expires;

receiving, by the network switching center of the telephone network, a confirmation that the second user device is ringing;

notifying, by the network switching center of the telephone network, the SCP that the second user device is ringing; and releasing, by the SCP, the call in response to being notified that the second user device is ringing and after the maximum call duration timer expires.

6. The method of claim 5, wherein the network event is a chargeable event.

7. The method of claim 5, wherein the call duration quota is zero.

* * * * *